(12) United States Patent
Pirotte et al.

(10) Patent No.: US 9,579,933 B2
(45) Date of Patent: Feb. 28, 2017

(54) TIRE WITH DISSYMMETRICAL BEADS

(75) Inventors: Pascal Pirotte, Clermont-Ferrand (FR); Christophe Egerszegi, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 261 days.

(21) Appl. No.: 13/883,108

(22) PCT Filed: Nov. 14, 2011

(86) PCT No.: PCT/EP2011/070028
§ 371 (c)(1),
(2), (4) Date: Jul. 17, 2013

(87) PCT Pub. No.: WO2012/065939
PCT Pub. Date: May 24, 2012

(65) Prior Publication Data
US 2013/0299058 A1 Nov. 14, 2013

(30) Foreign Application Priority Data
Nov. 18, 2010 (FR) ...................... 10 59469

(51) Int. Cl.
*B60C 3/06* (2006.01)
*B60C 15/02* (2006.01)
(Continued)

(52) U.S. Cl.
CPC ................ *B60C 15/02* (2013.01); *B60C 3/06* (2013.01); *B60C 15/0236* (2013.01);
(Continued)

(58) Field of Classification Search
CPC .................. B60C 3/06; B60C 15/0236; B60C 2015/0696; B60C 15/02; B60C 15/024;
(Continued)

(56) References Cited

U.S. PATENT DOCUMENTS 1,921,331 A * 8/1933 Townsley .................... 152/381.3
3,515,196 A * 6/1970 Floria ........................ 152/456 X
(Continued)

FOREIGN PATENT DOCUMENTS

DE     101 13 203 A1 * 10/2002
EP     2 090 445 A1    8/2009
(Continued)

OTHER PUBLICATIONS

English machine translation of EP 2 127 913 A1, Dec. 2, 2009.*
(Continued)

*Primary Examiner* — Adrienne C Johnstone
(74) *Attorney, Agent, or Firm* — Dickinson Wright PLLC

(57) ABSTRACT

A tire intended to be mounted on a drop-center rim with a flange height G and a radius of curvature R1 has first and second beads each having an annular reinforcing structure having a radially innermost point, the radial distance between the radially innermost point and the mounting rim being A, and a carcass reinforcement anchored in the two beads by being turned back around the annular reinforcing structure forming, within each bead, a main strand and a turned-back strand, in which the thicknesses EB1 of the first bead and EB2 of the second bead are the distance separating (i) the point on the main strand that is at a distance R from the radially innermost point, where $R=G+(R1)/2-A$, and (ii) the point on the exterior surface of the bead that is at the distance R from the radially innermost point, and in which $|EB1-EB2| \geq 1$ mm.

2 Claims, 5 Drawing Sheets

(51) Int. Cl.
*B60C 17/00* (2006.01)
*B60C 15/00* (2006.01)

(52) U.S. Cl.
CPC ...... *B60C 15/0018* (2013.04); *B60C 15/0036* (2013.04); *B60C 17/0009* (2013.04); *Y10T 152/10819* (2015.01)

(58) Field of Classification Search
CPC ... B60C 15/00; B60C 15/0242; B60C 19/001; Y10T 152/10504
USPC .............................. 152/455, 456, 544, 381.3
See application file for complete search history.

(56) References Cited

U.S. PATENT DOCUMENTS 3,946,784 A * 3/1976 Keith ............................ 152/455
5,591,282 A * 1/1997 Weber et al. ................. 152/456

FOREIGN PATENT DOCUMENTS

| EP | 2 127 913 A1 | * | 12/2009 |
|----|---|---|---|
| JP | 53040903 A | * | 4/1978 |
| JP | 11-227412 A | | 8/1999 |
| JP | 2003335112 A | * | 11/2003 |
| JP | 2009119923 | | 4/2009 |
| JP | 2009-298314 A | | 12/2009 |

OTHER PUBLICATIONS

English machine translation of DE 101 13 203 A1, Oct. 2, 2002.*
http://www.tyresizecalculator.com/wheels/wheel-rim-profiles, downloaded May 7, 2016.*
International Search Report (PCT/ISA/210) issued on Jan. 11, 2012, by the European Patent Office as the International Searching Authority for International Application No. PCT/EP2011/070028.
Japanese Office Action for Patent No. 2013-539215 date Oct. 19, 2015 (with English-Language Translation).

* cited by examiner

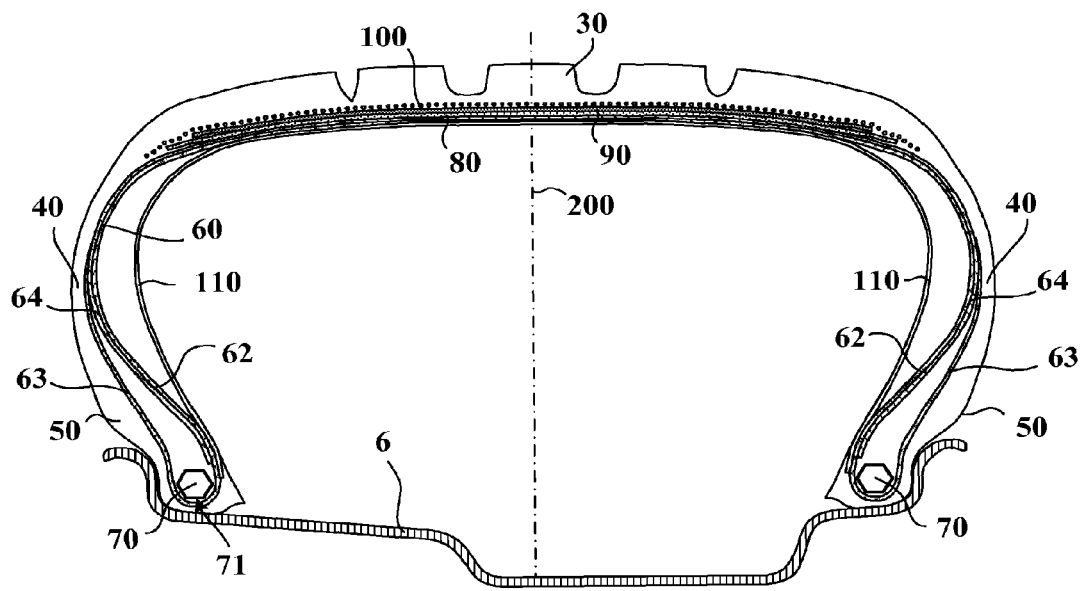
FIG. 3 (REFERENCE TIRE)
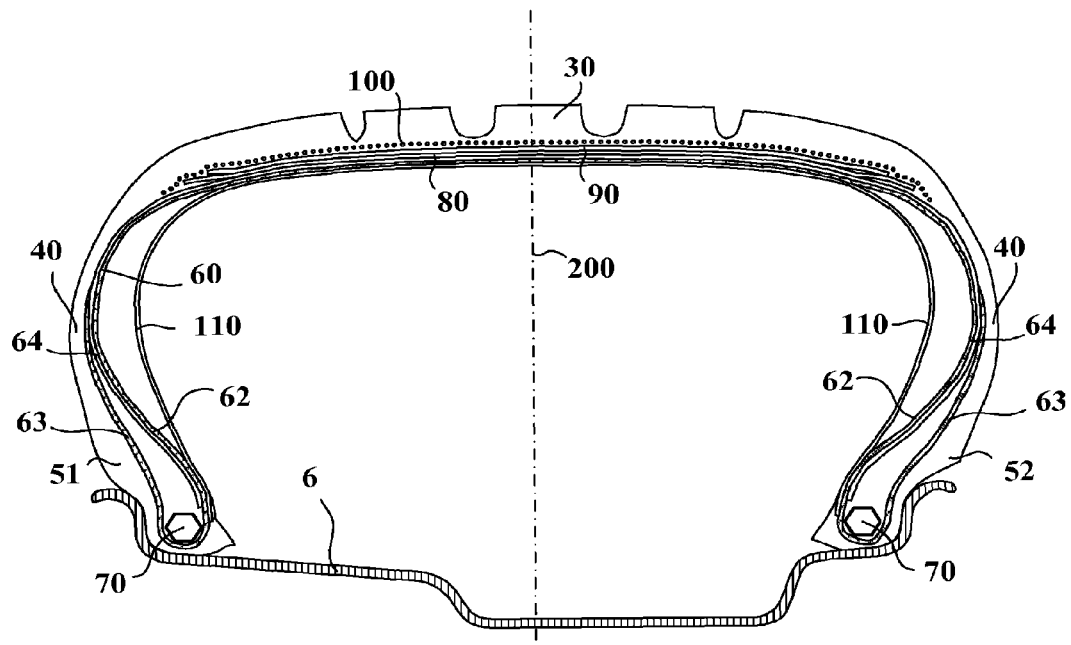
FIG. 4

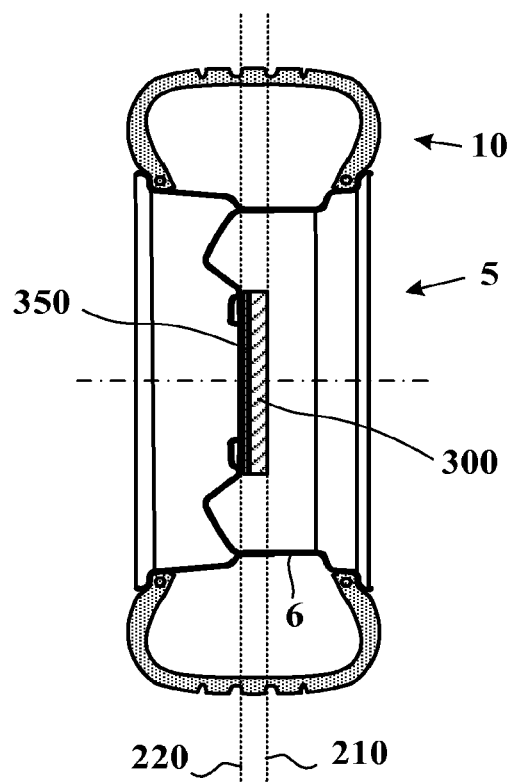
FIG. 8 (REFERENCE TIRE)
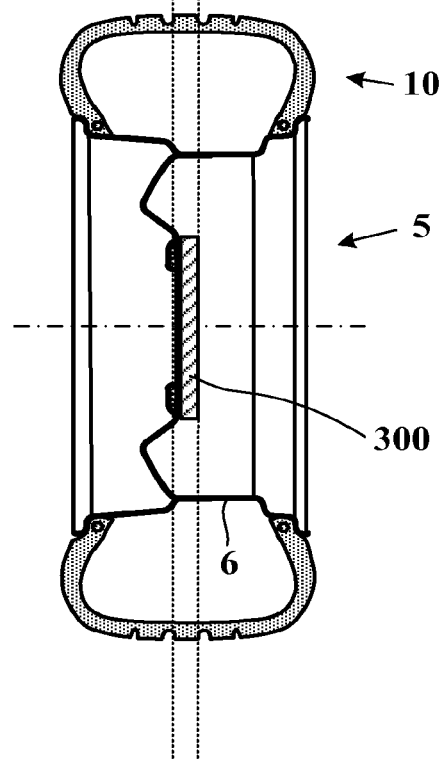
FIG. 9

TIRE WITH DISSYMMETRICAL BEADS

FIELD OF THE INVENTION

The present invention relates to passenger vehicle tires and to tire-wheel assemblies comprising passenger vehicle tires.

BACKGROUND

The way in which a vehicle fitted with passenger vehicle tires behaves is dependent on a whole host of parameters, both related to the vehicle and related to the tire-wheel assemblies. Among these parameters there is the offset of the wheels with respect to the vehicle. By changing this offset it is possible to have a significant influence on how the vehicle behaves and the driver's impressions with respect to this behavior. It is possible to change this offset by changing the wheel design or by using spacer pieces positioned between the wheel and the hub.

Within the context of developing a tire for a given vehicle, changing the model of wheel or using such spacer pieces are not always conceivable. This is because there are a number of types or brands of tire that can generally be fitted to this vehicle, but the wheel offset required in order to achieve the target behavior may differ according to the type or brand of tire.

SUMMARY OF THE INVENTION

It is one of the objectives of the present invention to allow the offset of a tire-wheel assembly with respect to the vehicle to be modified without changing the wheel or using spacer pieces.

This objective is achieved by modifying the beads of the tires used in such assemblies so as to result in a lateral shifting of the tread.

More specifically, the objective is achieved using a tire intended to be mounted on a drop-center rim in accordance with the ETRTO standards and having a diameter code greater than or equal to 10 and less than or equal to 20 and type "B" or "J" flanges, with a flange height G and a radius of curvature R1, and inflated with an inflating gas, this tire comprising a first and a second bead, the two beads being intended to come into contact with said mounting rim, each bead having an exterior surface, intended to be in contact with the atmospheric air, and an interior surface, intended to be in contact with the gas with which the tire is inflated, each bead comprising at least one annular reinforcing structure, the annular reinforcing structure having, in any radial section, at least one radially innermost point, the radial distance between the radially innermost point of the annular reinforcing structure and the mounting rim being denoted by A; two sidewalls extending the beads radially outwards, the two sidewalls meeting in a crown comprising a crown reinforcement surmounted by a tread; and a carcass reinforcement extending from the beads through the sidewalls as far as the crown, the carcass reinforcement comprising a plurality of carcass reinforcing elements and being anchored in the two beads by being turned back around the annular reinforcing structure so as to form, within each bead, a main strand and a turned-back strand.

In a tire according to the invention, the first bead has a thickness EB1 and the second bead has a thickness EB2, the thicknesses EB1 and EB2 being defined as the distance separating (i) the point on the main strand of carcass reinforcement that is at a distance R from said radially innermost point of the annular reinforcing structure of the bead, where $R=G+R1/2-A$, and (ii) the point on the exterior surface of the bead that is at this same distance R from said radially innermost point of the annular reinforcing structure of the bead, these distances being measured when the tire is mounted on said mounting rim and inflated to its service pressure.

In a tire according to the invention, the absolute value of the difference between the thicknesses EB1 and EB2 is greater than or equal to 1 mm, and preferably greater than or equal to 3 mm. For preference, the difference between the thicknesses EB1 and EB2 is less than or equal to 8 mm, and more preferably still, less than or equal to 6 mm.

The Applicant Company has found that, by using such tires, it is possible to obtain offsets of the tire tread in relation to the vehicle that are equivalent to those obtained on the tire-wheel assembly using spacer pieces a few millimeters thick. This observation is unexpected because one would have expected the position of the tread of the tire in relation to the mounting rim to be determined primarily by the geometry of the tire carcass reinforcement under the effect of the inflation pressure, and for the bead thickness not to have a decisive role in the axial positioning of the tread.

The invention also relates to a tire-wheel assembly comprising such a tire, namely to a tire-wheel assembly comprising: a wheel comprising a drop-center rim in accordance with the ETRTO standards and having a diameter code greater than or equal to 10 and less than or equal to 20 and type "B" or "J" flanges, with a flange height G and a radius of curvature R1; a tire intended to be mounted on said mounting rim, and inflated with an inflating gas, this tire comprising a first and a second bead, the two beads being intended to come into contact with said mounting rim, each bead having an exterior surface, intended to be in contact with the atmospheric air, and an interior surface, intended to be in contact with the gas with which the tire is inflated, each bead comprising at least one annular reinforcing structure, the annular reinforcing structure having, in any radial section, at least one radially innermost point the radial distance between the radially innermost point of the annular reinforcing structure and the mounting rim being denoted by A; two sidewalls extending the beads radially outwards, the two sidewalls meeting in a crown comprising a crown reinforcement surmounted by a tread; a carcass reinforcement extending from the beads through the sidewalls as far as the crown, the carcass reinforcement comprising a plurality of carcass reinforcing elements and being anchored in the two beads by being turned back around the annular reinforcing structure so as to form, within each bead, a main strand and a turned-back strand; in which the first bead has a thickness EB1 and the second bead has a thickness EB2, the thicknesses EB1 and EB2 being defined as the distance separating (i) the point on the main strand of carcass reinforcement that is at a distance R from said radially innermost point of the annular reinforcing structure of the bead, where $R=G+R1/2-A$, and (ii) the point on the exterior surface of the bead that is at this same distance R from said radially innermost point of the annular reinforcing structure of the bead, and in which the absolute value of the difference between the thicknesses EB1 and EB2 is greater than or equal to 1 mm, and preferably greater than or equal to 3 mm.

BRIEF DESCRIPTION OF THE DRAWINGS

FIG. 3 depicts, in radial cross section, a portion of a tire-wheel assembly comprising a reference tire having symmetric beads.

FIGS. 4 and 5 depict, in radial cross section, a portion of a tire-wheel assembly comprising a tire according to the invention.

FIGS. 7 to 9 illustrate the effect obtained by using a tire according to the invention.

DETAILED DESCRIPTION OF THE INVENTION

When using the term "radial" it is appropriate to make a distinction between the various uses made of this word by those skilled in the art. Firstly, the expression refers to a radius of the tire. It is in this sense that a point P1 is said to be "radially inside" a point P2 (or "radially on the inside of" the point P2) if it is closer to the axis of rotation of the tire than is the point P2. Conversely, a point P3 is said to be "radially outside" a point P4 (or "radially on the outside of" the point P4) if it is further away from the axis of rotation of the tire than is the point P4. Progress will be said to be "radially inwards (or outwards)" when it is in the direction towards smaller (or larger) radii. It is in this sense that the term applies also when matters of radial distances are being discussed.

By contrast, a thread or reinforcement is said to be "radial" when the thread or the reinforcing elements of the reinforcement make an angle greater than or equal to 80° and less than or equal to 90° with the circumferential direction. Let us specify that, in this document, the term "thread" is to be understood in a very general sense and comprises threads in the form of monofilaments, multifilaments, cords, yarns or equivalent assemblies, irrespective of the material of which the thread is made or the surface treatment it has received in order to enhance its bonding with the rubber.

Finally, a "radial section" or "radial cross section" here means a section or cross section on a plane containing the axis of rotation of the tire.

An "axial" direction is a direction parallel to the axis of rotation of the tire. A point P5 is said to be "axially inside" a point P6 (or "axially on the inside of" the point P6) if it is closer to the median plane of the tire than is the point P6. Conversely, a point P7 is said to be "axially outside" a point P8 (or "axially on the outside of" the point P8) if it is further from the median plane of the tire than is the point P8. The "median plane" of the tire is the plane which is perpendicular to the axis of rotation of the tire and which lies equidistant from the annular reinforcing structures of each bead. When the median plane is said to separate, in any radial section, the tire into two tire "halves", that does not mean that the median plane necessarily constitutes a plane of symmetry of the tire. The expression "tire half" has a broader meaning here and denotes a portion of the tire that has an axial width close to half the axial width of the tire.

A "circumferential" direction is a direction which is perpendicular both to a radius of a tire and to the axis direction.

In the context of this document, the expression "rubber composition" denotes a composition of rubber containing at least one elastomer and a filler.

Figure 1:
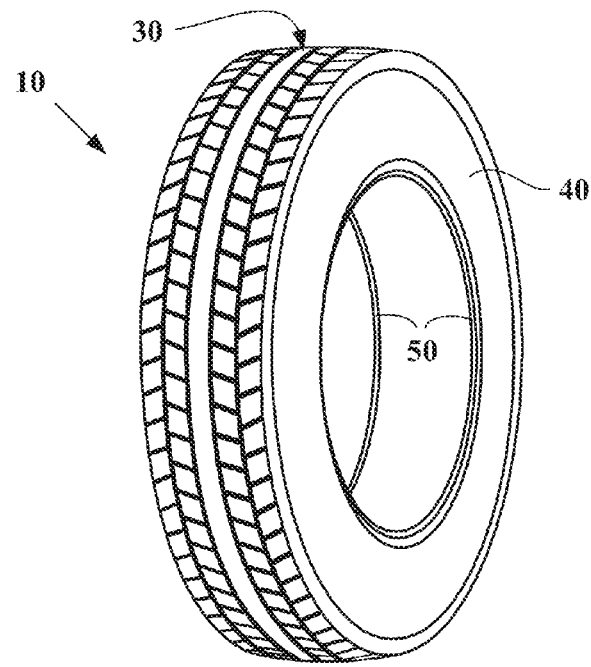
FIG. 1 depicts a tire according to the prior art.

FIG. 1 schematically depicts a tire 10 according to the prior art. The tire 10 comprises a crown comprising a crown reinforcement (not visible in FIG. 1) surmounted by a tread 30, two sidewalls 40 extending the crown radially inwards, and two beads 50 radially on the inside of the sidewalls 40.

Figure 2:
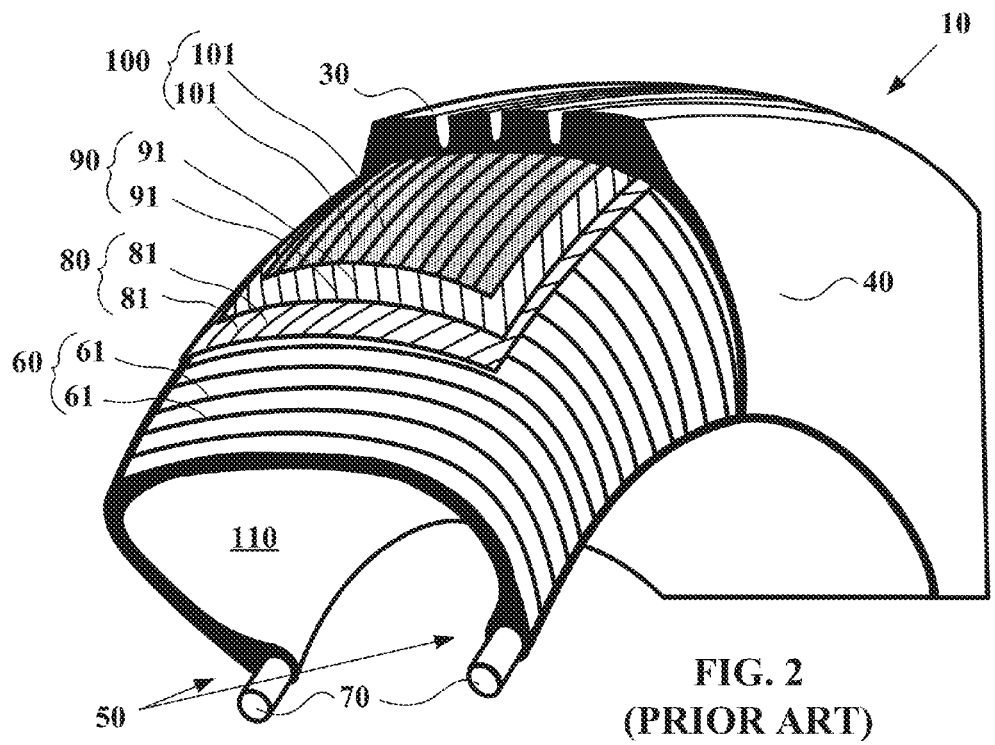
FIG. 2 depicts a partial perspective view of a tire according to the prior art.

FIG. 2 schematically depicts a partial perspective view of another tire 10 according to the prior art and illustrates the various components of the tire. The tire 10 comprises a carcass reinforcement 60 made up of threads 61 coated with rubber composition, and two beads 50 each comprising circumferential reinforcements 70 (in this instance, bead wires) which hold the tire 10 on the rim (not depicted). The carcass reinforcement 60 is anchored in each of the beads 50. The tire 10 further comprises a crown reinforcement comprising two plies 80 and 90. Each of the plies 80 and 90 is reinforced with thread-like reinforcing elements 81 and 91 which are parallel within each layer and crossed from one layer to the other, making angles of between 10° and 70° with the circumferential direction. The tire further comprises a hooping reinforcement 100, positioned radially on the outside of the crown reinforcement, this hooping reinforcement being formed of circumferentially orientated reinforcing elements 101 wound in a spiral. A tread 30 is laid on the hooping reinforcement; it is via this tread 30 that the tire 10 makes contact with the road. The tire 10 depicted is a "tubeless" tire: it comprises an "inner liner" 110 made of a rubber composition that is impervious to the inflating gas, covering the interior surface of the tire.

Figure 6:
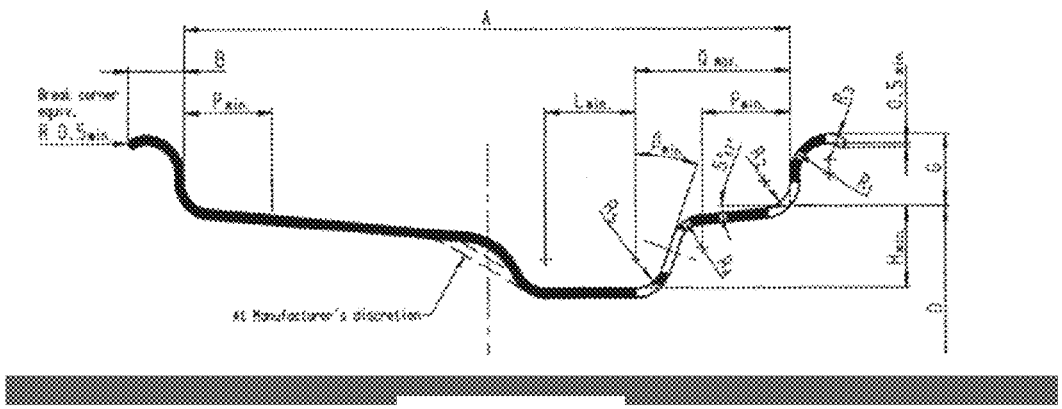
FIG. 6 is an extract from the ETRTO "Standard Manual 2010".

FIG. 3 depicts, in radial cross section, a portion of a tire-wheel assembly comprising a reference tire. The tire is mounted on a drop-center rim 6 that complies with the ETRTO (European Tyre and Rim Technical Organisation) standards. This is a drop-center rim having a diameter code greater than or equal to 10 and less than or equal to 20 ("diameter code 10 to 20 Drop-Centre Rim") as depicted on pages R8 et seq. of the ETRTO "Standards Manual 2010". The rim in question has flanges with a flange height G and a radius of curvature R1. The precise definition of these parameters can be seen in FIG. 6, which is taken from page R8 of the "Standards Manual 2010". For the differences between type "B" and type "J" flanges, the reader is referred to the table on page R9 of the ETRTO "Standards Manual 2010".

The tire comprises two symmetric beads 50 intended to come into contact with said mounting rim 6, each bead 50 having an exterior surface intended to be in contact with the atmospheric air, and an interior surface intended to be in contact with the gas with which the tire is inflated. Each bead 50 comprises at least one annular reinforcing structure 70, the annular reinforcing structure having, in any radial section, at least one radially innermost point 71. It should be noted that when the bead comprises several annular reinforcing structures 70, it is the radially innermost point 71 of the assembly made up of the various annular reinforcing structures that is considered. When several points of the annular reinforcing structure(s) 70 lie at the same minimal radial distance from the axis of rotation of the tire, any one of these points will be considered.

The tire also comprises two sidewalls 40 extending the beads radially outwards, the two sidewalls meeting in a crown comprising a crown reinforcement formed of the plies 80 and 90 and surmounted by a hooping reinforcement 100 and a tread 30. The median plane of the tire is indicated by the reference 200.

The tire also comprises a carcass reinforcement 60 extending from the beads 50 through the sidewalls 40 as far as the crown. The carcass reinforcement 60 is anchored in the two beads by being turned back around the annular reinforcing structure 70 so as to form, within each bead, a main strand 62 and a turned-neck strand 63. In this particular instance, the carcass reinforcement 60 also comprises a second layer 64 likewise extending from the beads 50 through the sidewalls 40 as far as the crown, but not anchored to the annular reinforcing structure 70 by a turned-back portion.

Figure 5:
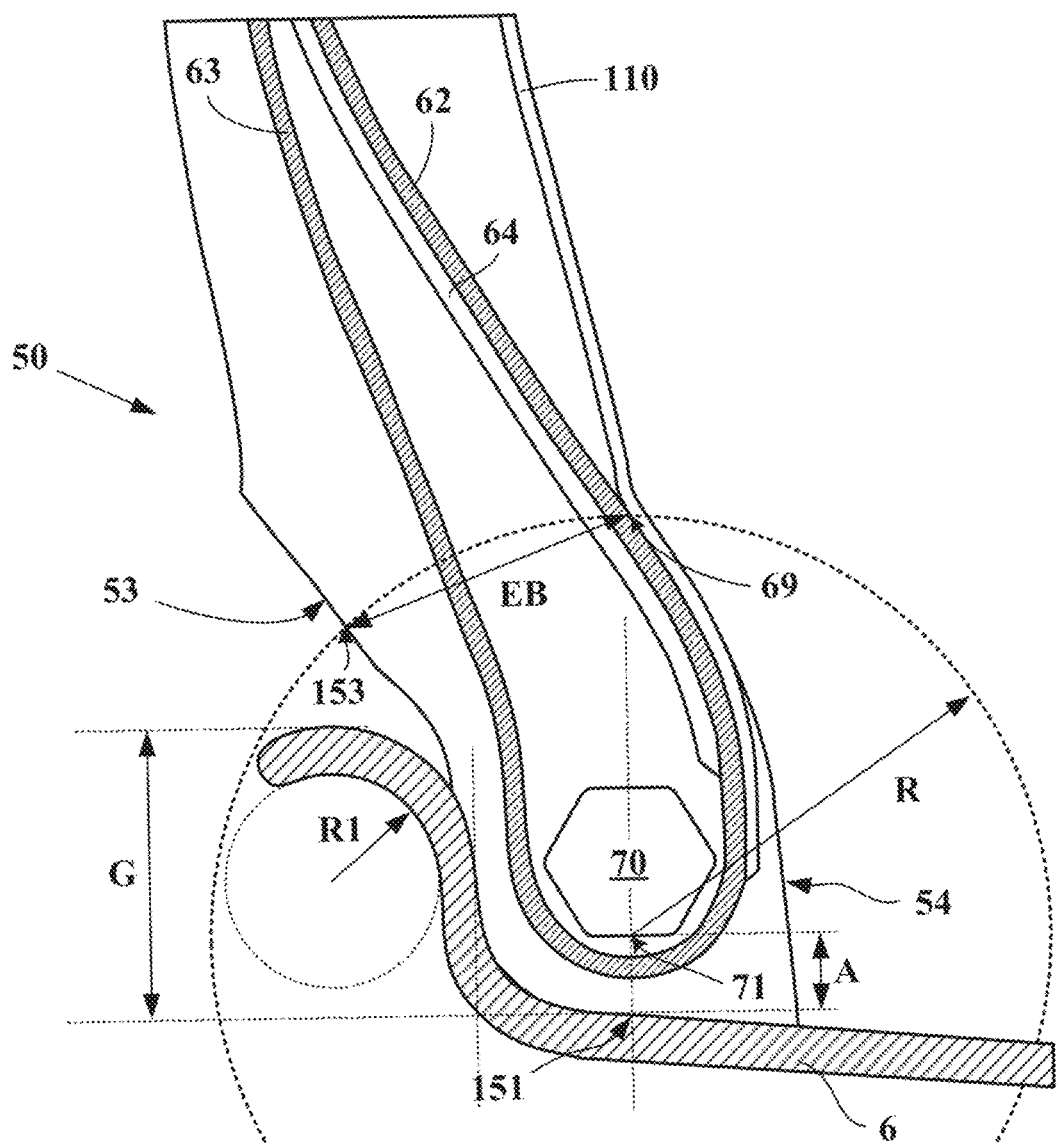

FIGS. 4 and 5 depict, in radial cross section, a portion of a tire-wheel assembly comprising a tire according to the invention. Like the tire depicted in FIG. 3, the tire that forms part of this tire-wheel assembly is intended to be mounted on a drop-center rim 6 in accordance with the ETRTO standards ("diameter code 10 to 20 Drop-Centre Rim") having "J" type flanges with a flange height G and a radius of curvature R1.

The tire comprises a first bead 51 and a second bead 52, the two beads 51 and 52 being intended to come into contact with said mounting rim 6. Each bead has an exterior surface 53 (see FIG. 5) intended to be in contact with the atmospheric air, and an interior surface 54 (see FIG. 5) intended to be in contact with the gas with which the tire is inflated. Each bead comprises at least one annular reinforcing structure 70 which, in any radial section, has at least one radially innermost point 71, the radial distance between the radially innermost point 71 of the annular reinforcing structure and the mounting rim 6 (at its point 151) being denoted by A (see FIG. 5).

The tire also comprises two sidewalls 40 extending the beads radially outwards, the two sidewalls 40 meeting in a crown comprising a crown reinforcement comprising two plies 80 and 90 surmounted by a hooping reinforcement 100 and a tread 30.

The tire further comprises a carcass reinforcement 60 extending from the beads 51, 52 through the sidewalls 40 as far as the crown. The carcass reinforcement 60 is anchored in the two beads by being turned back around the annular reinforcing structure 70, so as to form, within each bead, a main strand 62 and a turned-back strand 63. In this instance, the carcass reinforcement 60 further comprises a second layer 64 which extends from the beads 51, 52 through the sidewalls 40 as far as the crown, but which is not anchored to the annular reinforcing structure 70 by a turned-back portion.

The characterizing feature of the tire according to the invention is that it has asymmetric beads. The first bead 51 has a thickness EB1 and the second bead 52 has a thickness EB2, the thicknesses EB1 and EB2 being defined as the distance separating (i) the point 69 (see FIG. 5) on the interior surface of the main strand 2 of carcass reinforcement 60 that is at a distance R from said radially innermost point 71 of the annular reinforcing structure of the bead, where R=G+R1/2-A, and (ii) the point 153 (see FIG. 5) on the exterior surface of the bead that is at this same distance R from said radially innermost point 71 of the annular reinforcing structure 70 of the bead, these distances being measured when the tire is mounted on said mounting rim 6 and inflated to its service pressure. In a tire according to the invention, the absolute value of the difference between the thicknesses EB1 and EB2 is greater than or equal to 1 mm:|EB1-EB2|≥1 mm. As shown in FIG. 5, the point 153 is not in contact with the rim flange.

When several points on the main strand 62 of the carcass reinforcement 60 lie at a distance R from at least one of said at least one radially innermost point 71 of the at least one annular reinforcing structure of the bead, said point 69 is defined as being the axially innermost point of these points such that the circle having radius R extending from a single one of said at least one radially innermost point intersects both said axially innermost point on the interior surface of the main strand of carcass reinforcement and said point on the exterior surface of the bead, the radial distance A being measured from said single one of said at least one radially innermost point of the at least one annular reinforcing structure of the bead.

It should be noted that, while the examples depicted in FIGS. 3 and 4 correspond to what are known as "run flat" tires in which the reinforced sidewalls allow running even with low or no inflation pressure, the invention is not in any way restricted to such tires and can be implemented on all passenger vehicle tires.

The Applicant Company has found that by using tires that have asymmetric beads 51, 52, it is possible to obtain offsets of the tread in relation to the vehicle that are equivalent to those obtained with spacer pieces several millimeters thick. As already stated earlier, this observation is unexpected because one would have expected the position of the tire in relation to its mounting rim to be determined primarily by the geometry of its carcass reinforcement under the effect of the inflation pressure and for the thickness of the beads not to have a decisive role in the axial positioning of the tread.

Figure 7:
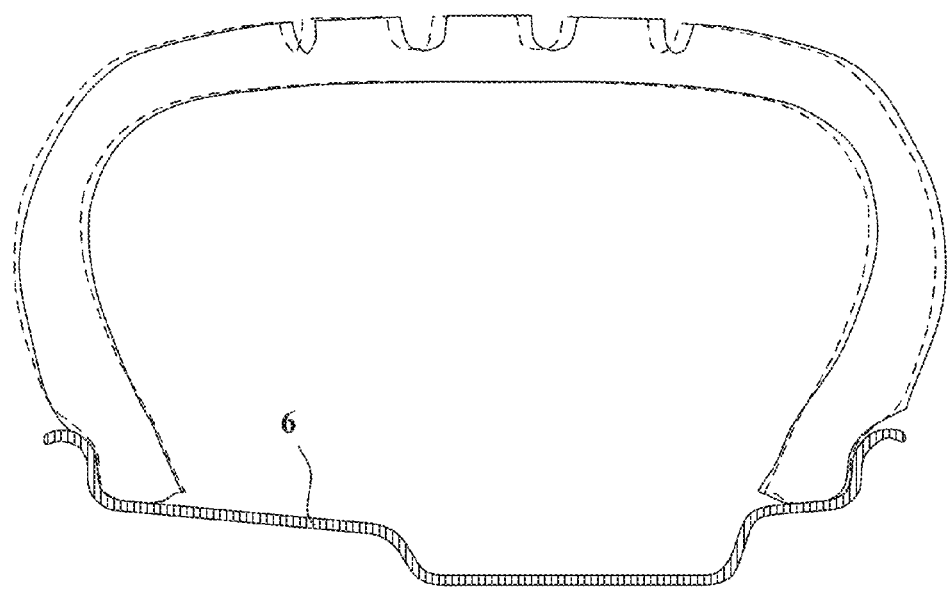

FIGS. 7 to 9 illustrate the effect obtained by using a tire according to the invention.

In FIG. 7, the contours of the tires depicted in FIGS. 3 (dotted line) and 4 (continuous line) have been superposed. It may be seen that the asymmetry of the beads does indeed cause an offsetting of the crown of the tire.

FIG. 8 shows a reference tire-wheel assembly in which the wheel 5 is separated from the hub 300 by a spacer piece 350 measuring a few millimeters in order to obtain a given offset.

FIG. 9 shows a tire-wheel assembly according to the invention, comprising a tire like the one depicted in FIG. 4. The wheel 5 here is fixed directly to the hub 300, with no spacer piece. The asymmetry of the beads causes an offset that is substantially identical to that obtained with the spacer piece 350.

The invention claimed is:

1. A tire mounted on a drop-center standard rim having a diameter code greater than or equal to 10 and less than or equal to 20 and type "B" or "J" flanges, with a flange height G and a radius of curvature R1, the tire being inflated with an inflating gas to the tire's service pressure, this tire comprising:

a first and a second bead, the two beads coming into contact with said mounting rim, each bead having an exterior surface, in contact with the atmospheric air, and an interior surface, in contact with the gas with which the tire is inflated, each bead comprising at least one annular reinforcing structure, the at least one annular reinforcing structure having, in any radial section, at least one radially innermost point;

two sidewalls extending the beads radially outwards, the two sidewalls meeting in a crown comprising a crown reinforcement surmounted by a tread;

a carcass reinforcement extending from the beads through the sidewalls as far as the crown, the carcass reinforcement comprising a plurality of carcass reinforcing elements and being anchored in the two beads by being turned back around the at least one annular reinforcing structure so as to form, within each bead, a main strand and a turned-back strand;

wherein the first bead has a thickness EB1 and the second bead has a thickness EB2, the thicknesses EB1 and EB2 being defined as the distance separating (i) the axially innermost point on the interior surface of the main strand of carcass reinforcement that is at a distance R from a single one of said at least one radially innermost point of the at least one annular reinforcing structure of the bead, where the radial distance between said single one of said at least one radially innermost point of the at least one annular reinforcing structure and the mounting rim is denoted by A and $R=G+(R1)/2-A$, and (ii) the point on the exterior surface of the bead that is at this same distance R from said one of said at least one radially innermost point of the at least one annular reinforcing structure of the bead, and wherein the absolute value of the difference between the thicknesses EB1 and EB2 is greater than or equal to 1 mm and less than or equal to 8 mm, and the point on the exterior surface of the bead that is at the same distance R from the one of the at least one radially innermost point of the at least one annular reinforcing structure of the bead is not in contact with the rim flange.

2. The tire according to claim 1, wherein the difference between the thicknesses EB1 and EB2 is greater than or equal to 3 mm.

\* \* \* \* \*